United States Patent [19]
Berkovich

[11] Patent Number: 5,146,456
[45] Date of Patent: Sep. 8, 1992

[54] COMPUTER SYSTEM WITH DISTRIBUTED CONTENT-ADDRESSABLE MEMORY MODULES COMPATIBLE WITH CITO TRANSMISSION

[75] Inventor: Semyon Berkovich, Rockville, Md.

[73] Assignee: Allied-Signal Inc., Morris Township, Morris County, N.J.

[21] Appl. No.: 571,339

[22] Filed: Aug. 21, 1990

Related U.S. Application Data

[63] Continuation-in-part of Ser. No. 179464, Apr. 8, 1988, abandoned.

[51] Int. Cl.$^5$ .............................................. H04J 3/12
[52] U.S. Cl. .................................. 370/110.4; 370/118; 365/49
[58] Field of Search .................. 370/85.1, 118, 119, 370/110.4, 110.1; 365/49

[56] References Cited

U.S. PATENT DOCUMENTS

| | | | |
|---|---|---|---|
| 4,493,074 | 1/1985 | Walter et al. | 370/119 |
| 4,598,411 | 7/1986 | Berkovich et al. | 370/118 |
| 4,755,974 | 7/1988 | Yamade et al. | 365/49 |

Primary Examiner—Douglas W. Olms
Assistant Examiner—Wellington Chin
Attorney, Agent, or Firm—Howard G. Massung; Robert A. Walsh

[57] ABSTRACT

A processing system using a number of distributed associative (content addressable) memory modules each connected through a sending device to a common serial communication bus. The memory modules are custom designed to unload stored data to a central receiver using a content induced transaction overlap (CITO) transmission.

17 Claims, 5 Drawing Sheets

COMPUTER SYSTEM WITH DISTRIBUTED CONTENT-ADDRESSABLE MEMORY MODULES COMPATIBLE WITH CITO TRANSMISSION

CROSS-REFERENCE TO RELATED APPLICATIONS

This application is a continuation part of utility patent application Ser. No. 179,464 filed Apr. 8, 19888, abandoned.

BACKGROUND OF THE INVENTION

1. Field of the invention

The present invention relates to a system employing a number of content-addressable memories accessed by a central processor, and more particularly to a processing system using a distributed associative (content addressable) memory consisting of separate content-addressable memory modules accessible over a serial communication link through corresponding sending modules which compress and transmit data according to content induced transaction overlap (CITO) methodology.

2. Description of the Background

Serial communication channels are commonly interconnected to multiple input/output ports which transfer data in accordance with the protocol of the communication channel. The data transferred on the bus is normally determined by the input/output port given access to the bus. Normally, one word or a sequence of words or a sequence of bits of a word may be transferred serially on the bus.

In U.S. Pat. No. 4,493,074, which issued on Jan. 8, 1985 to C. J. Walter et al., a communication channel was described incorporating a content induced transaction overlap (CITO) protocol. In the '074 patent, the senders simultaneously transmit the highest order bits of their data word one bit at a time serially and monitor the state of the communication channel. Transmission of data bits is terminated by all senders which detect a difference between the state of their transmitted data bit and the state of the communication channel. Bit competition performed at the end of each transmitted data word determines which sender has lexicographically the next smallest word from among those senders still having data bits remaining to be transmitted, the sender then being activated to transmit its remaining data bits. This procedure continues until all of the senders have completed the sending of their data word. In this manner, the sender having the smallest word numerically transmits the word first on the communication channel. All senders are given an opportunity to transmit their word prior to any sender sending a second word.

The '074 patent results in significant data compression because words are simultaneously transmitted from the multiple senders to the extent that their data is redundant, the non-redundant data being transmitted sequentially. Reconstruction of a complete word is subsequently performed by the receiver which appends the higher order bits to subsequently received lower order bits.

Previously, the use of serial communication links to couple distributed memories in computer architectures was limited due to the additional time required to transmit data serially. Furthermore, the choice of memory was limited to conventional RAMs or the like which operate by conventional addressing. Certain operations such as search operations are inherently slow because each RAM must cycle through every address. The serial data transmission delay is significantly reduced by the '074 patent, which increases the rate of serial communication. If the RAM-accessing delay could be eliminated, a distributed computer system which utilizes modular memories connected through a serial communication link to a central processor would be a practical system with many advantages. For example, the memory capacity could be expanded or contracted (depending upon the needs of the user) simply by connecting or disconnecting memory modules to/from the serial communications link. Furthermore, although unitary supercomputers may be prohibitively expensive, an equivalent amount of computing power could be realized by a distributed system using numerous interconnected memory modules. The smaller memories could be manufactured at a lower cost in the aggregate.

SUMMARY OF THE INVENTION

It is, therefore, an object of the present invention to interconnect a plurality of associative memory modules through a plurality of respective senders to a single communication channel which utilizes a content induced transaction overlap (CITO) protocol.

It is another object of the invention to provide a computing system capable of quickly communicating stored data from a number of distributed memory modules to a central receiver.

It is another object of the invention to provide a distributed computer having memory modules which are customized for use in a CITO communication system.

It is a further object of the invention to sense the content of data stored in a memory module without addressing the data, and to provide a CITO encoded result which can be transmitted serially to a central receiver according to CITO protocol.

According to the present invention, the above-described and other objects are accomplished by providing a computer system with a distributed associative memory, the computer system comprising a first serial communication bus, a receiver connected to the first communication bus for receiving serial data, a number of associative memory modules for storing data words and for sensing the information content of the stored data words and generating and storing a code indicative of the information content, a number of second serial communication busses each connected to a corresponding one of the content addressable memory modules, a corresponding number of sending devices each coupled to one of the second serial communication busses for reading code from the attached memory module, each sending device being connected to the first serial communication bus for collective synchronous transmission of content induced transaction overlap (CITO) composed data derived from the code, the transmission being in accordance with CITO protocol.

BRIEF DESCRIPTION OF THE DRAWINGS

Other objects, features and advantages of the present invention will become more apparent from the following detailed description of preferred embodiments and certain modifications thereof when taken together with the accompanying drawings, in which.

DETAILED DESCRIPTION OF THE PREFERRED EMBODIMENT

Figure 1:
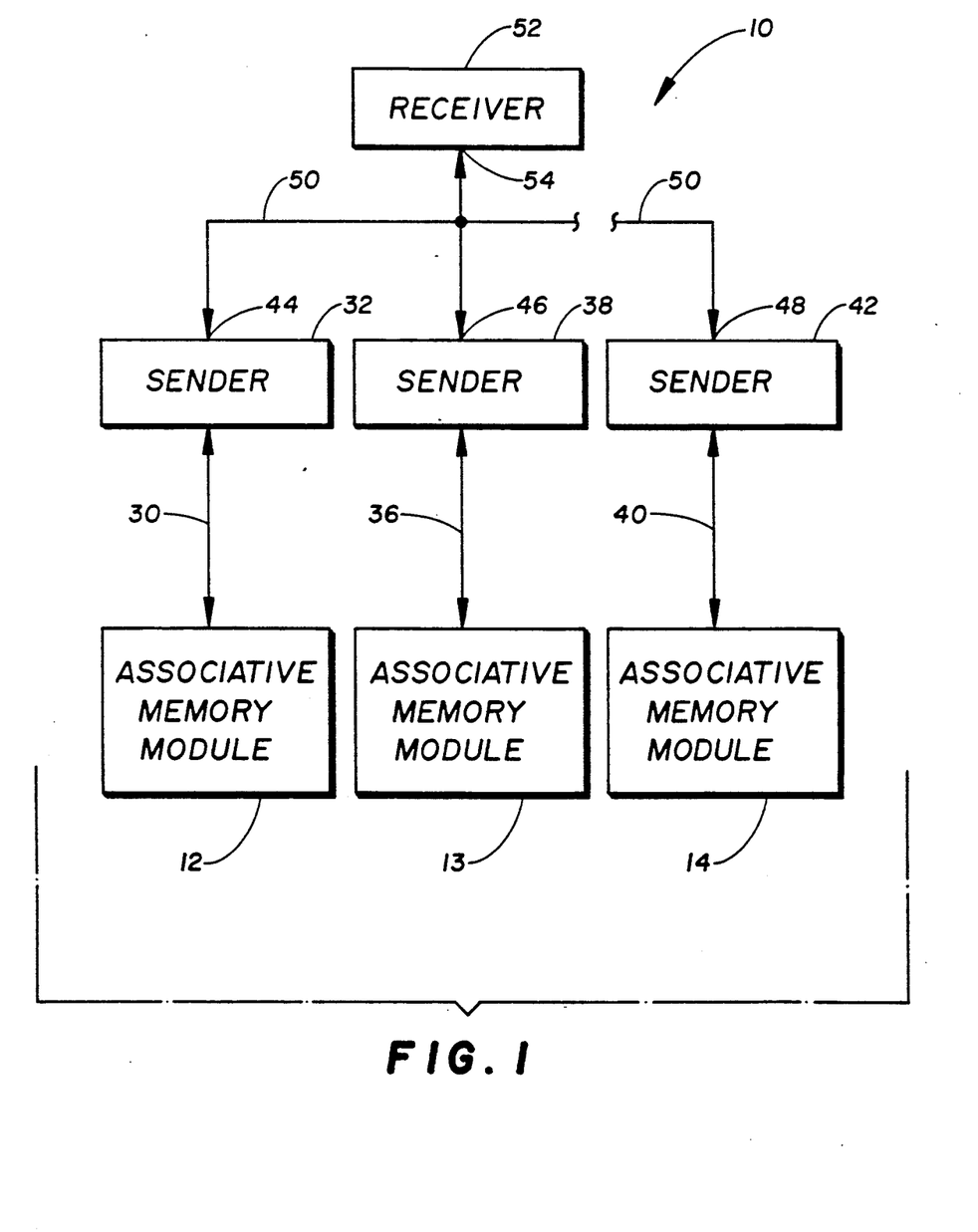
FIG. 1 is a block diagram illustrating a computer system, having distributed associative memory modules according to the present invention.

FIG. 1 shows a computer system having distributed (multiple remote) associative (content addressable) memory modules 12, 13 and 14 which communicate with a central receiver 52 via a corresponding number of sending devices 32, 38 and 42 transmitting over a common serial communication bus 50.

Memory module 12 is coupled over bi-directional bus 30 to sending device 32. Memory module 13 is coupled over bi-directional bus 36 to sending device 38. Likewise, memory module 14 is coupled over bi-directional bus 40 to sending device 42. Each sending device 32, 38 and 42 has a corresponding bi-directional port 44, 46 and 48 all of which are coupled in common to communication channel 50. Receiver 52 has a bi-directional port 54 which is also coupled to communication channel 50. Sending devices 32, 38 and 42 transmit binary data to one another and to receiver 52 over communication channel 50 in accordance with the content induced transaction overlap (CITO) communication protocol more fully described in U.S. Pat. No. 4,493,074 which issued Jan. 8, 1985 and is incorporated herein by reference.

Figure 2:
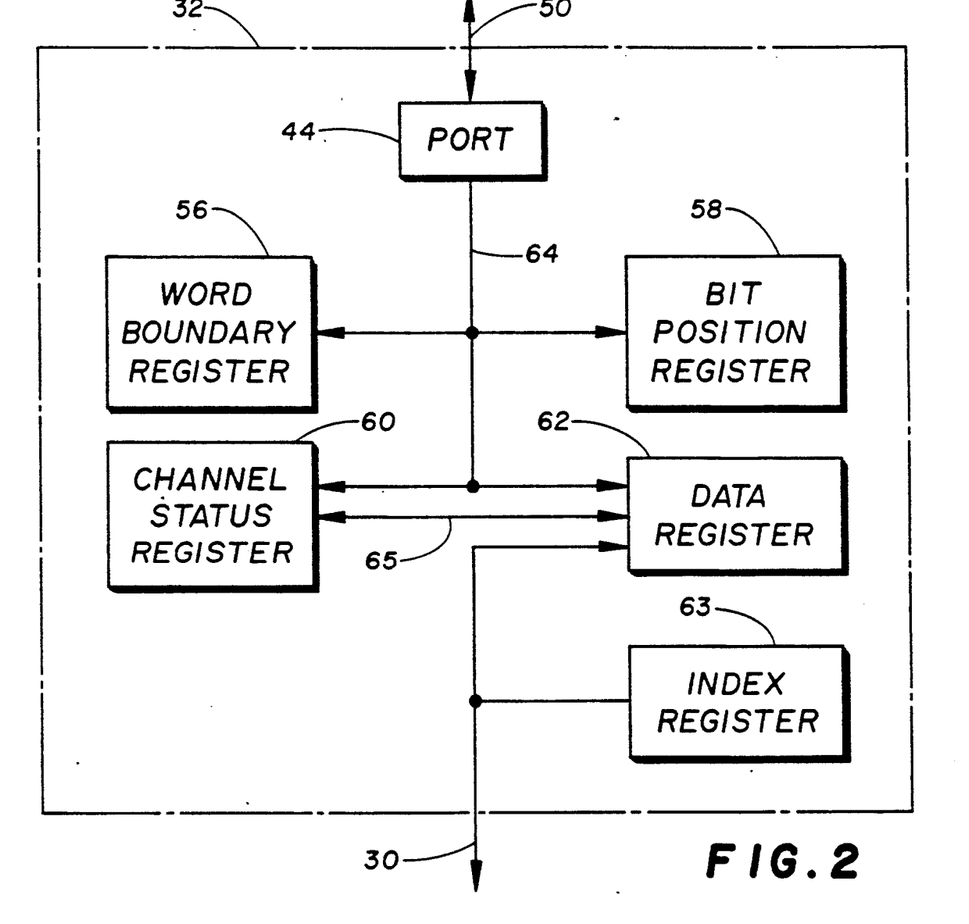
FIG. 2 is a schematic block diagram illustrating the primary components of a sending device used in the computer system of FIG. 1.

FIG. 2 is a schematic block diagram illustrating the primary components of sending device 32 which are identical to those of sending devices 38 and 42. Sending devices 32, 38 and 42 and receiver 52 may contain additional circuitry (not shown) to enable the receiver to reconstruct and receive each data word transmitted on communication channel 50 using the CITO communication protocol. As shown, sending device 32 has a data register for storing a word of data or portion thereof to be transmitted over serial communication bus 50. Sending device 32 has a word boundary register 56 for storing the length (number of bits) of the data word to be transmitted. Sending device 32 also has a bit position register 58 for storing the number of bits in the data word which remain to be transmitted. Sending device 32 has a channel status register for comparing the content of the data register at a particular bit position with the binary level of the communication channel 50. The index register 63 is a pointer which points to the data bit in data register 62 which is to be transmitted next. Index register 63 also points to the corresponding column in memory 68'. In addition, sending device 32 has a port 44 for coupling communication channel 50 to word boundary register 56, bit position register 58, channel status register 60 and data register 62 over lead 64. Bi-directional bus 30 is coupled to an input of data register 62. The operation and function of sending device 32 is the same as described for sending device 10 in U.S. Pat. No. 4,493,074, which issued on Jan. 8, 1985 and is incorporated by reference to describe the operation and function of sending device 32, communication bus 50 and receiver 52.

Figure 3:
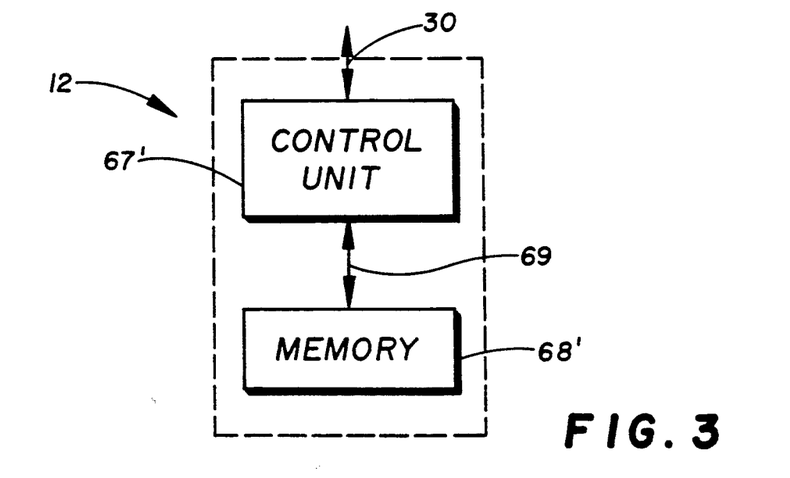
FIG. 3 is a block diagram of the primary components of the associative memory module according to the present invention.

FIG. 3 is a block diagram of associative memory module 12. Associative memory module 12 includes a memory 68' connected to a control unit 67' through bi-directional bus 69.

Figure 4:
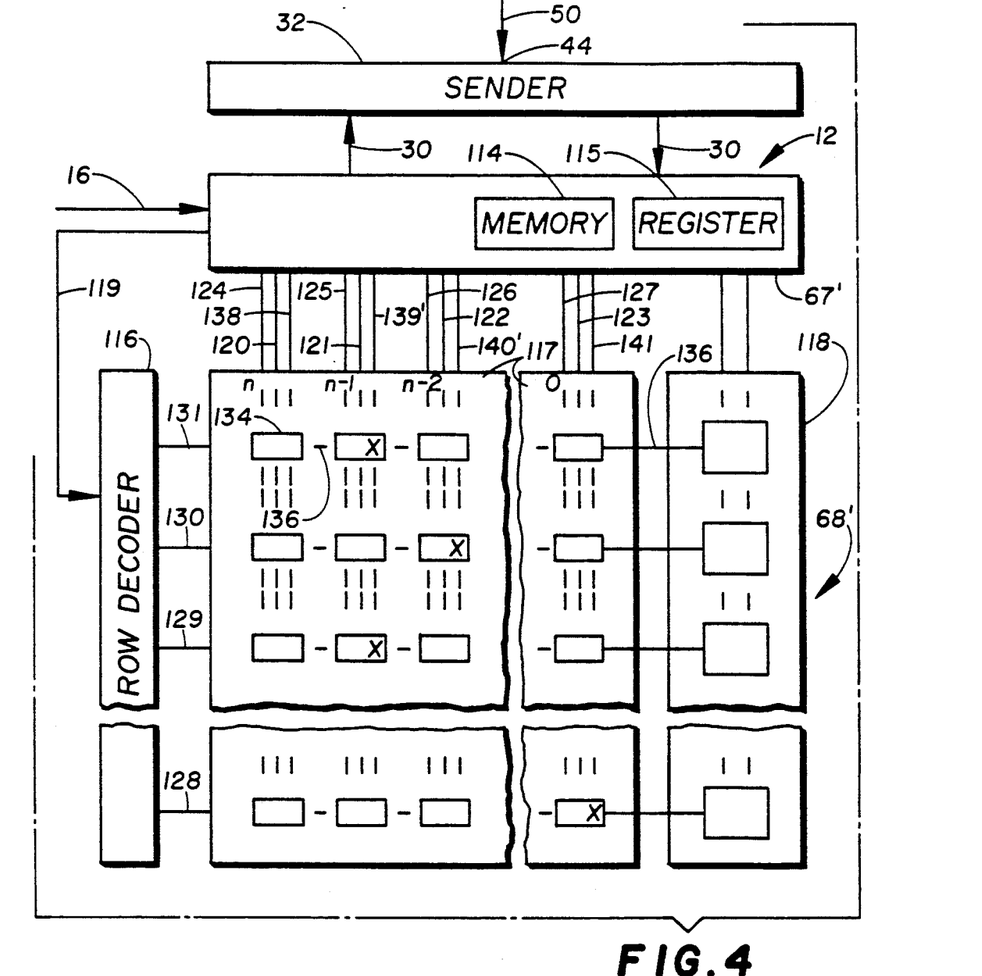
FIG. 4 is a circuit diagram of the associative memory module of FIG. 3.

FIG. 4 shows a detailed view of the associative memory module 12 of FIG. 3. Control unit 67' contains a memory 114 for storing bit positions (column numbers). Memory 114 may be a push down stack where bit positions are stored and read out according to last in first out, which is well known in the art. A register 115 is provided for storing a sequence of bi-phase data generated by memory 68'. Memory 68' further comprises a content addressable memory cell array 117 and a sensing block 118. Sensing block 118 is parallely coupled to memory cell array 117 in order to receive the results of a column-wise comparison of memory cells.

Figure 5:
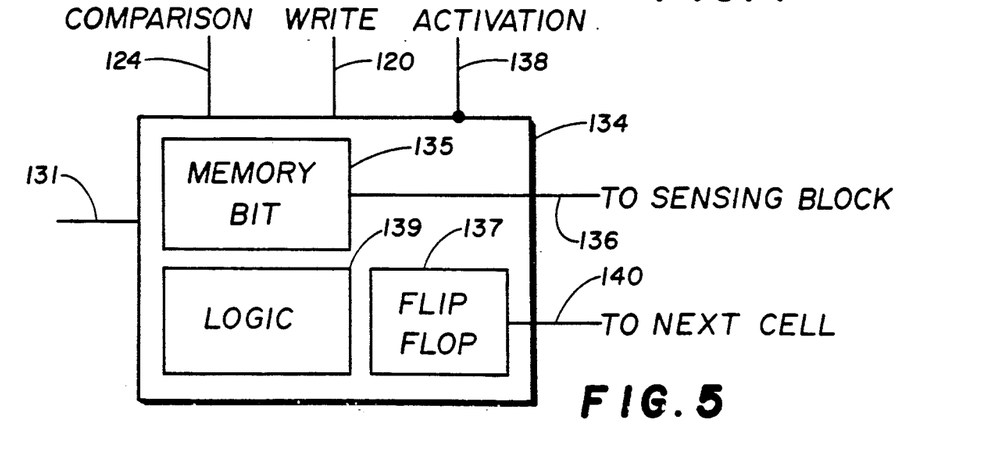
FIG. 5 is a block diagram of a memory cell used in the associative memory module of FIG. 4, according to the present invention.

FIG. 5 is a detail block diagram of an associative memory cell 134 which may be identical to each memory cell in content-addressable storage 117. In FIG. 5, memory cell 134 includes logic 139 which enables data to be written into memory bit 135 conditional on the data on comparison lead 124, write enable line 120 and word line 131. Further, logic 139 performs a comparison with the data stored in memory bit 135 when comparison lead 124 is pulsed in a first manner to indicate that each memory cell should compare its contents with "0" and in a second manner to indicate each memory cell in the column should compare its data with a "1". When the contents of memory bit 135 match a "0" or "1" as determined by the signal on comparison lead 124, a signal indicative of a match is output on lead 136 to sensing block 118. Each memory cell also has a flip-flop 137 for storing the activation status of memory cell 135 at times an activating signal on lead 138 goes high. In operation, if a logic "1" is stored in memory bit 135 and this matches the signal on comparison lead 124, a "1" will be stored in flip-flop 137 when lead 138 is activated. A logic "1" on the output of flip-flop 137 acts as an inhibit signal to disable succeeding lower-order bits of the word so that they cannot be read out. Flip-flop 137 may be reset at a later time by a logic "0" activating signal on lead 138. In sum, words containing a "1" in a particular column may be temporarily masked from access to the extent that all descending order bits cannot be read out.

Sensing block 118 converts the results of a column-wise comparison of the memory cells into a biphase signal as follows:

"01"—All words have zeros in this column;
"10"—All words have ones in this column;
"11"—This column has some ones and some zeroes;
"00"—All words are disabled.

Sensing block then stores the biphase signal.

In operation, data may be written into memory 68' and may be unloaded therefrom en masse in a read operation which uses the CITO method.

During a write operation, a control signal is transmitted to sending device 32. The control signal is then transmitted over bus 119 from sending device 32 to word decoder 116. Based on the control signal, word decoder 116 functions to select a row in memory cell array 117 wherein data is to be written. The selected row is activated by leads 128–131 which couple word decoder 116 to respective words within memory cell array 117. Write enable lines 120–123 are then activated, and the data to be written into memory cell array 117 is presented on leads 124–127.

A read operation takes place in accordance with the CITO procedure hereinafter described.

Figure 6A:
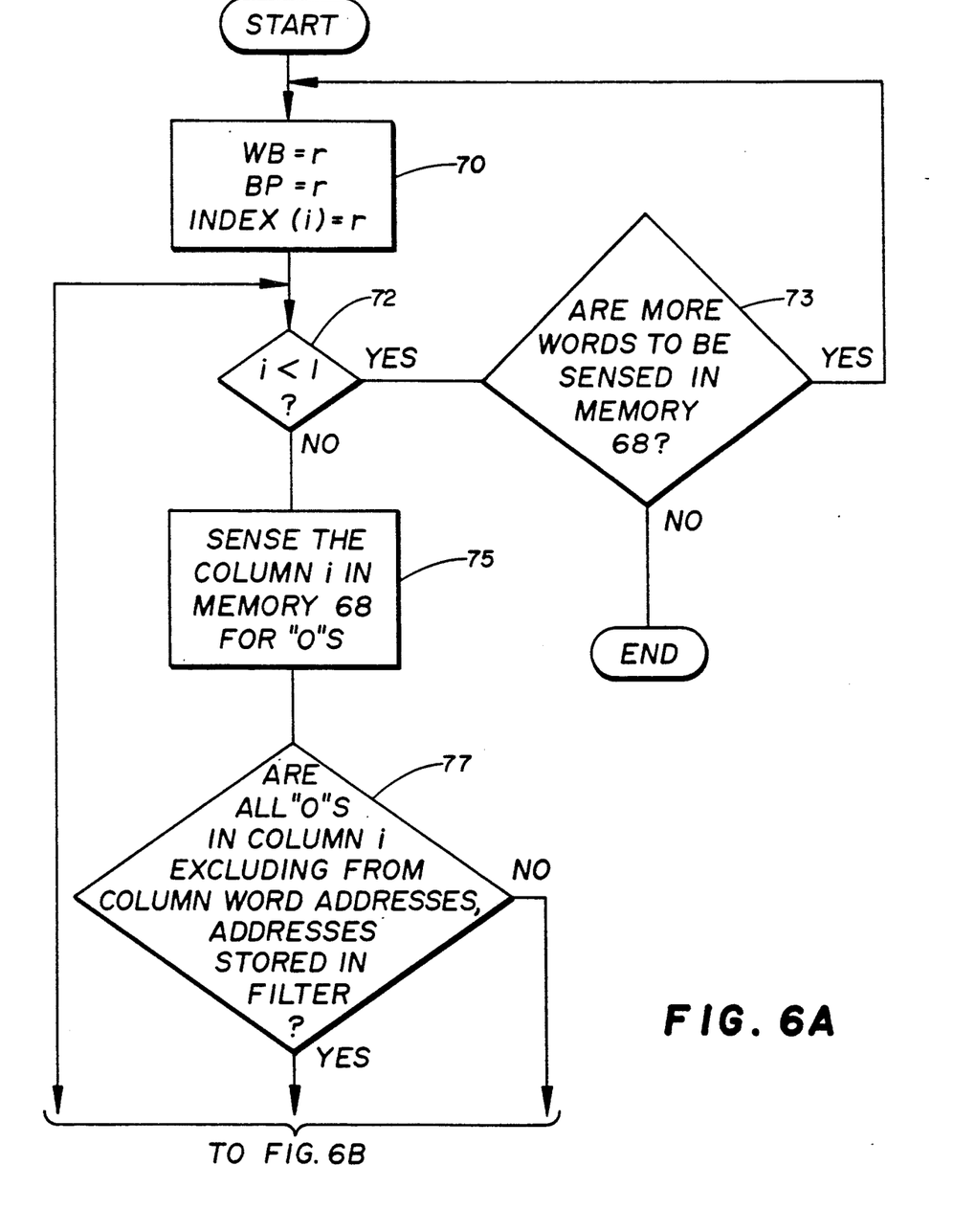
FIGS. 6A and 6B are a flow diagram illustrating the method by which stored data is transmitted to a central receiver according to a CITO protocol.
Figure 6B:
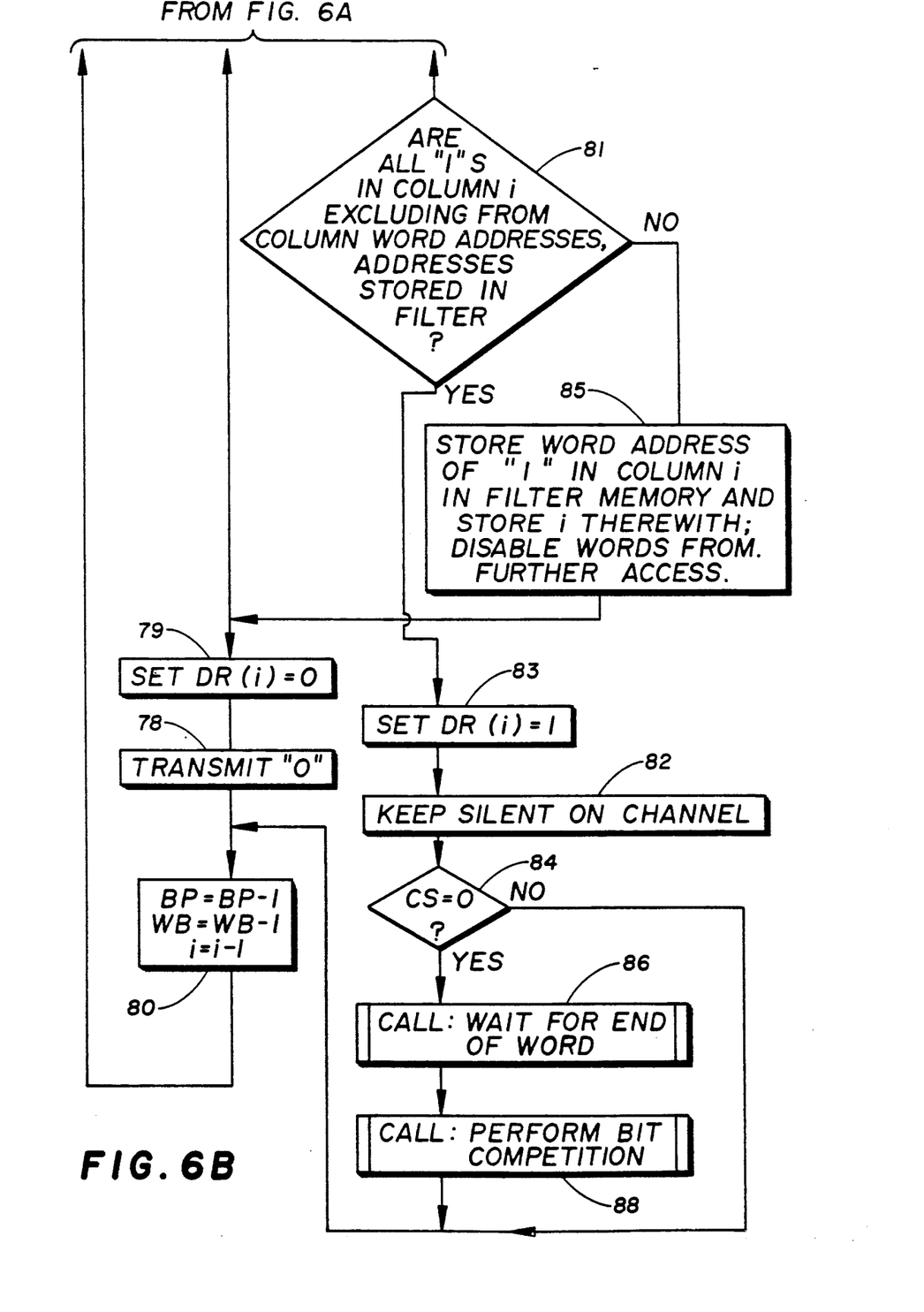

FIGS. 6A and 6B are block diagrams illustrating the method by which the data previously stored in content addressable memory 117 is unloaded to receiver 52. The method for unloading data will now be explained by reference to the above-described apparatus shown in FIGS. 1-5.

As shown in block 70, the contents "i" of word boundary register 56, bit position register 58, and index register 63 are set equal to "r" which represents the number of bits in each word of memory.

In decision block 72, if "i" is not less than "1", the program proceeds to block 75. The procedure in block 75 senses column i in memory 68 for "0"s. The control device 67' accomplishes this by pulsing comparison lead 124 of memory cell 134 with a signal indicating that the contents of the cell are to be compared with logic "0". Initially, the column containing the highest order bits will be compared with "0"s since the content of the index register was initialized to "r". This comparison is represented by decision block 77. The results of the comparison are output to sensing block 118 which converts the comparison data into a bi-phase signal as follows:

"01"—All words have zeros in this column;
"10"—All words have ones in this column; zeroes;
"00"—All words are disabled.

The bi-phase comparison signal is then stored in register 115 to flag the results of the comparison to sending device 44.

If register 115 indicates that all "0"s were sensed in column i of memory 68, then the program proceeds directly to procedure block 79. In procedure block 79, the $i^{th}$ bit of the data register 62 is set equal to "0".

If all "0"s were not sensed in column i of memory 68, then the program proceeds to decision block 81. If a mixture of "1"s and "0"s were sensed in column i of memory 68, then the program proceeds to procedure block 85. In procedure block 85, the value i is stored in memory 114 along with the addresses of the words containing "1"s in column i. The words having a "1" in the first column will have their flip-flop 137 set to a "1" when a logic "0" appears on activation lead 138. The storing of a "1" in flip-flop 137 will result in a signal on lead 140 to succeeding bits in the same word which will temporarily disable the lower bit positions and mask them from further readout. Thus, the descending order bits of words corresponding to the addresses stored in memory 114 are disabled from further access by memory 68. The program then proceeds to procedure block 79 wherein the $i^{th}$ bit of data register 62 is set equal to "0".

In either of the above cases where the first column contained all "0"s or a mixed bag of "0"s and "1"s, procedure block 78 is executed next and data register 62 transmits a "0" through port 44 and onto serial communication bus 50.

However, if the first column contained all "1"s, then procedure block 82 is executed next and sending device 42 transmits nothing. The contents "BP" of bit position register 58 are then decremented to BP=BP−1, the contents "WB" of word boundary register are decremented to WB=WB−1, and the contents "i" of index register are decremented to i=i−1. If all "1"s are in column i of memory 68, then the program proceeds to procedure block 83 wherein the $i^{th}$ bit of data register 62 is set to equal "1". The program proceeds to decision block 84 which checks the Channel Status (CS) register 60 to determine if another sending device, for example, sending device 38, transmitted a "0". If another sending device has transmitted a "0" sending device 32 executes the "wait for end of word" procedure block 86. Sending device 32 then monitors the channel status register while decrementing the content "WB" of its word boundary register to WB=WB−1 until one of the other sending devices 38 or 42 have finished transmitting a complete word. The program then goes to procedure block 88 in which a bit competition is performed with the remaining sending devices. Reference is herein made to U.S. Pat. No. 4,493,074 which issued on Jan. 8, 1985 to C. J. Walter, C. R. Wilson, and S. Berkovich, which in FIG. 7 shows a flow diagram containing identical blocks 70, 72, 74, 78, 80, 82, 84, 86 and 88, all fully described in the accompanying disclosure and incorporated herein by reference to describe the "wait for end of word" and "bit competition" subroutines. If sending device 32 wins the bit competition indicated by block 88, the program proceeds to block 80 wherein bit position register 58, word boundary register 56 and index register 63 are decremented. The program then returns to decision block 72.

The procedure is repeated from decision block 72, and if the new "i" is not less than "1", the program again proceeds to block 75. The procedure in block 75 senses column i in memory 68 for "0"s. The comparison is represented by decision block 77.

If all "0"s are sensed in column i of memory 68 (excluding rows which were previously masked), then the program proceeds directly to procedure block 79. In procedure block 79, the $i^{th}$ bit of the data register 62 is set equal to "0".

If all "0"s are not sensed in column i of memory 68 (excluding rows which were previously masked), then the program proceeds to decision block 81. Here, if all "1"s are not sensed in column i of memory 68 (excluding rows previously masked), then there is a mixture of "1"s and "0"s and the program proceeds to procedure block 85. In procedure block 85, the value i is stored in memory 114 along with the addresses of the words containing "1"s in column i. The words having a "1" in the first column will have their flip-flop 137 set to a "1" when a logic "0" appears on activation lead 138. The storing of a "1" in flip-flop 137 will result in a signal on lead 140 to succeeding bits in the same word which will temporarily disable those bit positions and mask them from further readout. The program then proceeds to procedure block 79 wherein the $i^{th}$ bit of data register 62 is set equal to "0".

In either of the above cases where the first column contained all "0"s or a mixed bag of "0"s and "1"s, procedure block 78 is executed and data register 62 transmits another "0" through port 44 and onto serial communication bus 50.

However, if the first column contained all "1"s, then procedure block 82 is executed next and sending device 42 transmits nothing. The contents "BP" of bit position register 58 are then decremented to BP=BP−1, the contents "WB" of word boundary register are decremented to WB=WB−1, and the contents "i" of index register are decremented to i=i−1. If all "1"s are in column i of memory 68, then the program proceeds to procedure block 83 wherein the $i^{th}$ bit of data register 62 is set to equal "1". After the ith bit of data register 62 is set to a logical "1" as provided by procedure block 83, the program proceeds to procedure block 82 wherein sending device 32 keeps silent on communication channel 50 and does not transmit the logical "1" data bit. The program proceeds to decision block 84 which checks the Channel Status (CS) register 60 to determine if another sending device transmitted a "0". If another sending device has transmitted a "0", sending device 32 executes the "wait for end of word" procedure block 86. Sending device 32 then monitors the channel status register while decrementing the content "WB" of its word boundary register to WB=WB−1 until the other sending device has finished transmitting a complete word. The program again goes to procedure block 88 in which a bit competition is performed with the remaining sending devices. If sending device 32 wins the bit competition indicated by block 88, the program proceeds to block 80 wherein bit position register 58, word boundary register 56 and index register 63 are decremented. Then the program again returns to decision block 72. The above-described procedure will be repeated again and again from procedure block 72 until the value of "i" falls to "0". At this point one word has been completely read out of content-addressable storage 117, and the last bit position to be stored in memory 114 will be read out and will function as a pointer to the column for readout of the next word from content-addressable storage 117. The column indicated by memory 114 will have its flip-flops 137 reset so that words previously disabled will be reactivated. The column that memory 114 will point to will necessarily contain a "1" and thus, a "1" may automatically be indicated for that column. A comparison for "0"'s may then be conducted on the column having the next lowest bit position.

Eventually, there will be no words left to transmit in any memory module. The CITO procedure results in the sending devices transmitting all of their words in order from the lexicographically smallest to the largest, with redundant "0" bits being transmitted simultaneously to conserve transmission time. The receiver is able to reconstruct the collective data from all memory modules 12–14.

In a different embodiment of the invention (not shown) a number of additional processors may be connected directly to corresponding memory modules. This allows the above-described associative computing system to share its memory modules with the decentralized processors, thereby allowing a choice of centralized or decentralized computing.

Having now fully set forth the preferred embodiment and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An apparatus for distributed associative computing, comprising:
   a first serial communication bus;
   a receiver connected to said first communication bus for receiving serial data transmitted thereon;
   a plurality of associative memory modules for storing data words and for sensing an information content of said stored data words and generating and storing a code indicative of said information content;
   a plurality of second serial communication busses each connected to a corresponding one of said content addressable memories;
   a corresponding plurality of senders each coupled to one of said second serial communication busses for reading said code from said corresponding associative memory module, each sender being connected to said first serial communication bus for bi-directional communication over said serial communication line of content induced transaction overlap (CITO) composed data derived from said code, said communication being in accordance with a CITO protocol.

2. The apparatus for distributed associative computing according to claim 1, wherein each one of said senders further comprises:
   a serial port for controllably communicating with said receiver in a serial manner over said first serial communication bus;
   a data register connected to said serial port for storing a data word or portion thereof to be transmitted over said first serial communication bus;
   a word boundary register connected to said serial port for storing a length of said data word to be transmitted over said first serial communication bus;
   a bit position register connected to said serial port for storing a number of bits of said data word which remain to be transmitted;
   a channel status register connected to said serial port for comparing a content of a particular bit position in said data register with a binary level of said first serial communication bus; and
   an index register connected to said data register for pointing to a particular data bit in said data register to be transmitted next, said index register also being connected to said second serial communication bus for pointing to a corresponding column of memory cells in said associative memory module.

3. The apparatus for distributed associative computing according to claim 1, wherein said plurality of associative memory modules each comprise,
   a control unit connected to said second serial communication bus;
   a memory cell array defined by rows and columns, said rows connected in parallel with said control unit for storing data words written therefrom;
   a row decoder connected to said control unit for receiving a control signal therefrom, said row decoder being connected in parallel with columns of said memory cell array for accessing selected rows, said selection being in accordance with said control signal; and
   a sensing block connected in parallel with columns of said memory cell array for sensing an information content of a column of said stored data words and generating and storing a code indicative of said information content.

4. The apparatus for distributed associative computing according to claim 3, wherein said memory cell array comprises a plurality of content-addressable memory cells arranged in rows and columns.

5. The apparatus for distributed associative computing according to claim 4, wherein each one of said content-addressable memory cells further comprises,
   a memory bit for storing a binary value, a read line coupled to said memory bit for controllably allowing a binary value to be read therefrom, a write line coupled to said memory bit for selectively allowing a binary value to be written to said memory bit, logic means connected to said memory bit for performing a comparison between a first binary value stored therein and a second binary value, a comparison lead for receiving a first pulse, thereby initiating said comparison wherein said second binary value is a logic "1", and for receiving a second pulse, thereby initiating said comparison wherein said second binary value is a logic "0", a flip-flop for controllably storing a result of said comparison, an activation line for enabling said flip-flop to store said result of said comparison, a sense line connected to said sensing block for outputting a binary value stored in said memory bit to said sensing block when allowed by said read line, an output line coupled to said flip-flop for outputting said stored result therefrom.

6. The apparatus for distributed associative computing according to claim 5, wherein the output lines of the content-addressable memory cells in said columns are coupled to corresponding read lines of the content-addressable memory cells in successive columns such that all succeeding memory cells within a row of said memory cell array may be disabled in accordance with a comparison result to mask a portion of said word stored in a row of memory cells.

7. The apparatus for distributed associative computing according to claim 5, wherein said sensing block is connected to the sense lines of the memory cells in said memory cell array for sensing an information content of a column of said stored data words and generating and storing a code indicative of said information content.

8. The apparatus for distributed associative computing according to claim 7, wherein said code is a biphase binary value.

9. The apparatus for distributed associative computing according to clam 6, wherein said sensing block is connected to the sense lines of the memory cells within a column of said memory cell array for sensing an information content of a corresponding column of said stored data words and generating and storing a code indicative of said information content.

10. The apparatus for distributed associative computing according to claim 9, wherein said code is as follows:

"01"—all of said stored words have a logic "0" within said corresponding column;

"10"—all of said stored words have a logic "1" within said corresponding column;

"11"—stored words have some logic "1"s and some logic "0"s within said corresponding column;

"00"—all of said stored words are disabled.

11. A content addressable memory module for storing and unloading data words, and for providing biphase signals indicative of said stored data words to a sending device capable of transmitting content induced transaction overlap (CITO) composed data derived from said biphase signals in accordance with a CITO protocol, said content addressable memory module comprising:

a control unit;

a memory cell array defined by rows and columns, said rows connected in parallel with said control unit for storing data words written therefrom;

a row decoder connected to said control unit for receiving a control signal therefrom, said row, decoder being connected in parallel with columns of said memory cell array for accessing selected rows, said selection being in accordance with said control signal; and a sensing block connected in parallel with columns of said memory cell array for sensing an information content of a column of said stored data words and generating and storing biphase signals suitable for input to a sending device capable of transmitting content induced transaction overlap (CITO) composed data derived from said biphase signals in accordance with a CITO protocol.

12. The content addressable memory module according to claim 11, wherein said memory cell array comprises a plurality of content-addressable memory cells arranged in rows and columns.

13. The content addressable memory module according to claim 12, wherein each one of said content-addressable memory cells further comprises, a memory bit for storing a binary value, a read line coupled to said memory bit for controllably allowing a binary value to be read therefrom, a write line coupled to said memory bit for selectively allowing a binary value to be written to said memory bit, logic means connected to said memory bit for performing a comparison between a first binary value stored therein and a second binary value, a comparison lead for receiving a first pulse, thereby initiating said comparison wherein said second binary value is a logic "1", and for receiving a second pulse, thereby initiating said comparison wherein said second binary value is a logic "0", a flip-flop for controllably storing a result of said comparison, an activation line for enabling said flip-flop to store said result of said comparison, a sense line connected to said sensing block for outputting a binary value stored in said memory bit to said sensing block when allowed by said read line, an output line coupled to said flip-flop for outputting said stored result therefrom.

14. The content addressable memory module according to claim 13, wherein the output lines of the content-addressable memory cells in said columns are coupled to corresponding read lines of the content-addressable memory cells in successive columns such that all succeeding memory cells within a row of said memory cell array may be disabled in accordance with a comparison result to mask a portion of said word stored in a row of memory cells.

15. The content addressable memory module according to claim 13, wherein said sensing block is connected to the sense lines of the memory cells in said memory cell array for sensing an information content of a column of said stored data words and generating and storing a biphase signal indicative of said information content.

16. The content addressable memory module according to claim 13, wherein said sensing block is connected to the sense lines of the memory cells within a column of said memory cell array for sensing an information content of a corresponding column of said stored data words and generating and storing a biphase signal indicative of said information content.

17. The content addressable memory module according to claim 16, wherein said biphase signal is as follows:

"01"—all of said stored words have a logic "0" within said corresponding column;

"10"—all of said stored words have a logic "1" within said corresponding column;

"11"—said stored words have some logic "1"s and some logic "0"s within said corresponding column;

"00"—all of said stored words are disabled.

* * * * *